(12) United States Patent
Rodriguez et al.

(10) Patent No.: US 6,393,974 B1
(45) Date of Patent: May 28, 2002

(54) APPARATUS FOR PRODUCTION OF A SMALL TORTILLA

(75) Inventors: Espiridion Valdes Rodriguez, Toluca; Efrain Joel Peña Sanchez, Atizapan de Zaragoza, both of (MX)

(73) Assignee: Central Impulsora, S.A. de C.V. (MX)

( * ) Notice: Subject to any disclaimer, the term of this patent is extended or adjusted under 35 U.S.C. 154(b) by 0 days.

(21) Appl. No.: 09/813,720

(22) Filed: Mar. 21, 2001

(51) Int. Cl.⁷ .............................. A21C 9/06; A21C 9/00

(52) U.S. Cl. .................. 99/450.2; 99/450.6; 99/450.1

(58) Field of Search ....................... 99/450.2, 450.1, 99/450.4, 450.6, 353, 349; 425/321, 372, 319, 320, 383, 363, 373

(56) References Cited

U.S. PATENT DOCUMENTS

| | | | |
|---|---|---|---|
| 2,450,033 A | * | 9/1948 | Cohen ....................... 99/450.2 |
| 4,389,176 A | * | 6/1983 | Nenci ......................... 425/101 |
| 4,666,391 A | * | 5/1987 | Watt et al. .................. 425/122 |

* cited by examiner

*Primary Examiner*—Reginald L. Alexander
(74) *Attorney, Agent, or Firm*—Gardere Wynne Sewell LLP

(57) ABSTRACT

The subject invention is an apparatus for production of rolled tortillas where small tortillas or flakes of raw dough of nixtamalized corn are rolled up in a continuous manner. The apparatus of the present invention utilizes an acceleration conveyor that allows for the speed of the conveyor to be varied to provide a more exact rolling up of small tortillas or flakes of raw dough of nixtamalized corn, continuously and automatically. The apparatus also utilizes pre-rolling up meshes and final rolling up meshes to produce more easily, perfectly, and efficiently such small tortillas of raw dough of nixtamalized corn.

2 Claims, 1 Drawing Sheet

APPARATUS FOR PRODUCTION OF A SMALL TORTILLA

This invention refers to an apparatus for rolling raw tortillas into the shape of a "taco." More specifically, totally automated equipment is provided for the precise and perfectly defined rolling up of small tortillas or flakes of raw dough of nixtamalized corn, which is done in a continuous manner.

BACKGROUND OF THE INVENTION

At the present, conventional sheeter laminators are employed for the elaboration of tortillas or raw dough flakes of nixtamalized corn. By means of a cutter, various shapes and sizes of tortillas or flakes are made through the design and predetermined molding of the same.

Until before the present invention, the shaping of "tacos" beginning with raw flakes or tortillas of nixtamalized corn dough in an automated manner was unknown as the manufacture of such product presented unsolved technical problems. Raw dough "tacos" may be of various sizes and thickness, depending on the size and thickness of the tortillas or flakes. The tortilla or flake is rolled up upon itself to acquire the shape of a taco.

The obvious solution to accomplish the rolling up of the raw tortilla has been to make it manually even in light of the problems that such procedure represents. Effectively, however, the manual elaboration of "tacos" starting with small tortillas of raw dough of nixtamalized corn does not meet the production expectations to cover a more or less ample market. On an industrial level, production of great volumes of product is necessary. Also, a considerable amount of labor is required resulting in high production costs and therefore low income-yield capability.

Hence, a need exists for a machine for rolling up small tortillas of raw dough of nixtamalized corn adapted for elaborating the food product mechanically in considerable amounts and at adequate speeds to meet industrial production expectations with commercial ends.

To produce small tortillas of raw dough of nixtamalized corn, the prior art teaches the utilization of a conventional sheeter laminator comprising: 1) a hopper for receiving the dough; 2) laminating rollers separated by a very short distance which spin both in the same direction toward the inside; 3) a lower roller with a cutter that gives shape and particular size to the tortillas or flakes unfastened by a device that causes the product not to stick; and 4) on the lower part of the laminator, an exit conveyor.

Attempts have been made to roll up the tortillas or flakes on themselves by placing persons at the sides of the conveyor who rolled up the tortillas manually. However, this is unacceptable as the final shape of the product is limited and is not attractive from the point of view of low production volumes. Manual labor also means high production costs, resulting in an operation with low income-yield capability.

Furthermore, adjustment of the speed of the exit conveyor together with modifications to the rollers is required. The new structure of the laminator eliminates the versatility of such conveyor and renders the laminator incapable of being used afterwards as other types of products requires speeds by which the laminator was redesigned.

Other prior art efforts include the design of a roller capable of spinning while maintaining looseness together with an ability to pivot vertically and thereby allowing for the tortillas being rolled properly on first pass. However, this equipment is very complex, requiring what could amount to an infinity of pieces to accommodate all of the possible positions and is therefore, very expensive and not cost justifiable.

A need exists therefore for an apparatus that is simple in design and substitutes labor with design while performing the same operation without the participation of workers' hands to produce product at increased production volumes, greater speeds and in less time.

SUMMARY OF THE INVENTION

The apparatus of subject invention comprises a sheeter laminator, an exit conveyor, and an acceleration conveyor having a transversal section equal to the exit conveyor. The acceleration conveyor is preferably propelled by a system of generation and transmission of movement. The system of generation and transmission of movement comprises a motor, a reducer, and a transmission guard on the axis of the roller of such acceleration conveyor. The acceleration conveyor has on its sides two housings placed with three rectangular support structures, each having an upper central slit fixed perpendicularly on the housings. Supported in a manner susceptible of being disassembled and transversally with respect to the acceleration conveyor are three shafts. Pending from two of the support structures at both ends, in a manner similar to a swing, is a set of pre-rolling up meshes. From the third shaft, there is pending, in a manner similar to a curtain, a set of final rolling up meshes.

The pre-rolling up meshes have a small surface of contact and drag with respect to the acceleration conveyor. The final rolling up meshes are pending in the form of a curtain and have a greater surface of contact and drag with the acceleration conveyor.

A system of generation and transmission of movement used in connection with the acceleration belt of the acceleration conveyor includes a frequency variator that permits varying the speed of the acceleration conveyor and adjusting the speed of the formed product, depending on the production line.

Hence, a feature of the invention is to produce such product at considerable speeds and at production volumes on a commercial level. Furthermore, the invention provides the ability to shape such product in a single line up to as many as may turn out to be shaped for the total width of operation of the production line.

Moreover, the apparatus of the subject invention is capable of being assembled and disassembled on any conventional laminator of sheeter line at the end of the exit conveyor, without affecting the elaboration of other products of the corn line.

The apparatus of the present invention substitutes the movement and manipulation effected by the human hand to roll up small tortillas of raw dough of nixtamalized corn yielding a final product in the shape of a "taco." Through use of a roller with the appropriate surface, the same operation is effected, providing the effect and manipulation necessary to be able to roll up such tortillas on themselves.

A mesh is positioned transversally to the exit conveyor of the sheeter laminator, hanging as a curtain and preventing the adherence of the raw dough tortillas or flakes to the mesh. The separation distance at which the raw dough tortillas or flakes come out is determined by the speed of the exit conveyor of the sheeter laminator and must be such that the tortillas or flakes are not too close together, or yielding two, three, or more tortillas at the same time.

To permit the production of elaborate tortillas or flakes of raw dough of nixtamalized corn at greater speeds, the acceleration conveyor at the end of the exit conveyor of the laminator was adapted to work with greater speed, by placing a frequency variator on the motor of such conveyor. This allows for adjusting the speed, making it more precise and providing a greater separation space between the tortillas. An adequate separation space is necessary to permit the precise rolling up of each tortilla or flake individually, thus eliminating the problem of agglutination.

To eliminate inefficiencies of production and malformations of product due to the lack of flexibility of the mesh in the shape of a curtain, a shorten mesh divided into sections improves the rolling up process and represents a considerable loss of raw dough.

In the preferred embodiment, two meshes are used for the rolling up small tortillas. While more meshes may be utilized, two curtains of meshes should provide the ability to obtain one hundred percent of product adequately formed and at the required operation speeds for the shaping of "tacos" starting with the precise rolling up on themselves of small tortillas of raw dough of nixtamalized corn, without modifying the sheeter laminator at all, maintaining its versatility and the possibility of using the same line to elaborate other characteristic products in this corn line, with no problem whatsoever.

The apparatus for production of small tortillas of raw dough of nixtamalized corn comprises an acceleration conveyor having an equal transversal section as the exit conveyor of the sheeter laminator, propelled by a system of generation and transmission of movement including a motor having a reducer and a transmission guard to transmit movement to the axis of the roller of such conveyor.

The acceleration conveyor includes a variable acceleration mesh and a housing on each side end. Such housings present a series of rectangular supports with slits on the upper part placed perpendicularly to such housings. Three shafts rest in each of the slits and are placed transversally with respect to the acceleration conveyor. In the two first shafts, a series of individual meshes are attached and pending, suspended on both ends in a manner similar to a swing, each end supported by the other shaft. Such meshes correspond to the pre-rolling up meshes having a small surface for dragging and contacting the mesh of the acceleration conveyor. This permits to fold upward only a small portion of the tortilla or flake. On the third and last shaft and attached from a single end in the shape of a curtain are a series of meshes aligned and in equal number as the aforementioned, which correspond to the final rolling up meshes, with a greater surface for contact and drag with the acceleration conveyor. With the help of the first folding previously effected, the final meshes permit roll up more easily, perfectly, and efficiently such small tortillas of raw dough of nixtamalized corn.

Such equipment has the particularity of implementing or incorporating as many pre-rolling up and final rolling up meshes for small tortillas of raw dough of nixtamalized corn, on the width of the acceleration conveyor, as lines of product are required.

In addition, such equipment has the particularity of being able to withdraw the shafts that support the pre-rolling up and final rolling up meshes of such small tortillas and continue to produce on the line, corn products with similar or different characteristics of the line, and without the need to make modifications to the structure or disassemble the additional equipment such as the acceleration belt, nor the housings with the supports.

DETAILED DESCRIPTION OF THE INVENTION

Figure 1:
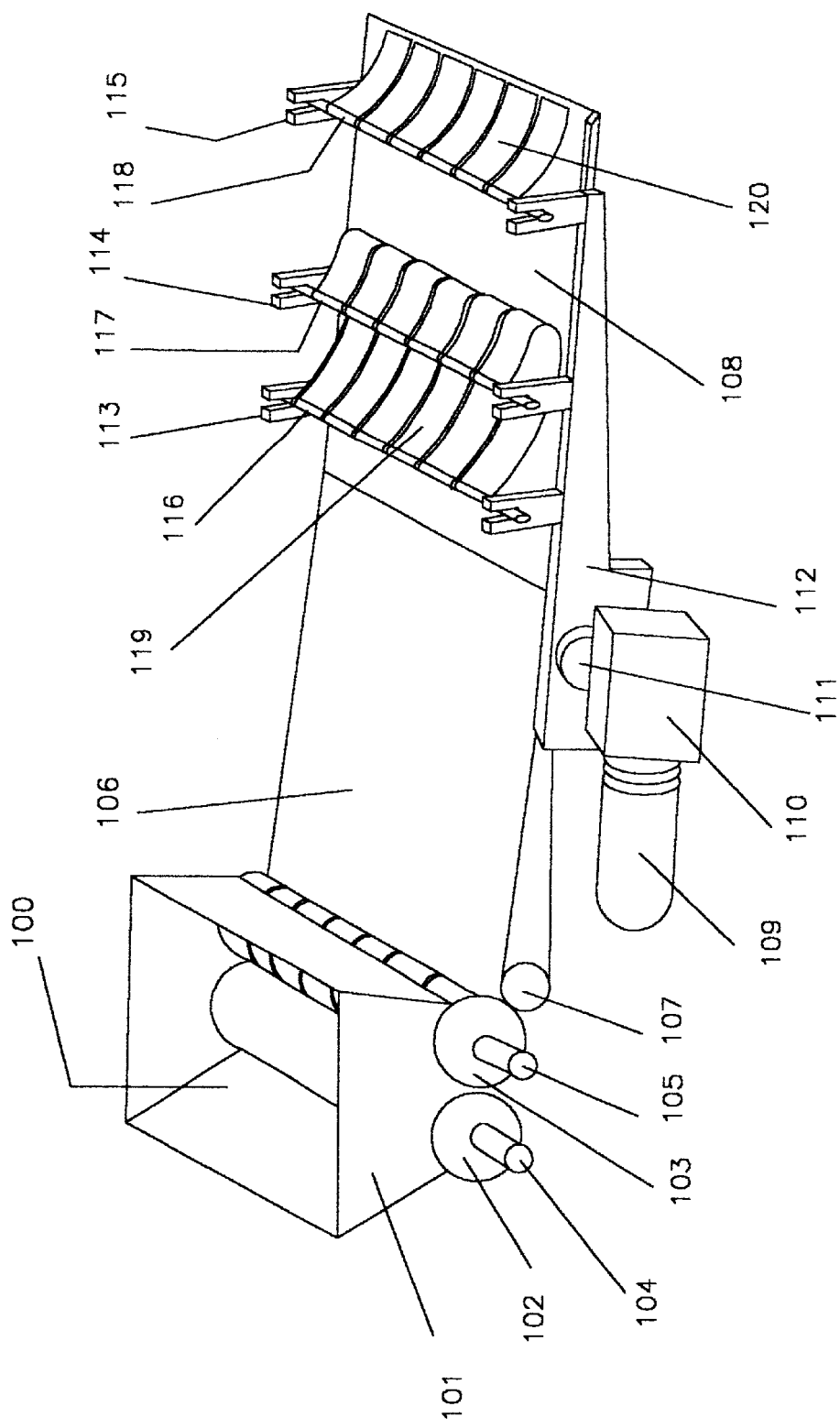
FIG. 1 shows an isometric view of the equipment for rolling up small tortillas of raw dough of nixtamalized corn, illustrating the placement and conformation of the sheeter laminator, the conveyor with metallic mesh of the laminator exit, the acceleration conveyor, the housings, the system of generation and transmission of movement, and the details of the placement and conformation of the axes on the supports, as well as the pre-rolling up and final rolling up meshes of such small tortillas.

This apparatus of the subject invention 10 provides the precise and perfectly defined rolling up of small flakes of raw dough of nixtamalized corn, in a continuous manner. The apparatus 10 comprises a conventional sheeter laminator 100, an exit conveyor 106 and an acceleration conveyor 108 placed at the end of the exit conveyor 100. The acceleration conveyor 108 is propelled by a system of generation and transmission of movement with a motor 109, a reducer, and a transmission guard 111 to the axis of the roller 107 of such acceleration conveyor 108. The acceleration conveyor 108 has housings 112 placed with three rectangular support structures 112, 113, 114, each housing having an upper central slit fixed perpendicularly. On such structures, three shafts 116, 117, 118 are supported in a manner susceptible of being disassembled, and transversally with respect to the acceleration conveyor 108. From two of these shafts 116, 117, there is pending on both sides in a manner similar to a swing, the set of pre-rolling up meshes 119 having a small surface of drag with respect to the acceleration conveyor 108. From the third shaft 118, there is pending on one end in a manner similar to a curtain, the set of final rolling up meshes 120 for such small tortillas having a greater surface of drag with the acceleration conveyor 108.

As shown in FIG. 1, the apparatus 10 of the subject invention comprises a sheeter laminator 100, a receiving hopper 101, an exit conveyor 106, an acceleration conveyor, prerolling up meshes 119, and final rolling up meshes 120.

Raw dough of nixtamalized corn is placed in the receiving hopper 101. Raw dough sheets are formed by the first and second rollers 102, 103. These rollers 102, 103 have two axes, a first axis 104 and a second axis 105, that spin in the same direction, toward the center, to favor the laminating process.

The second roller 103 has a series of divisions in its transversal section, and on its lower part there is a roller with a cutter (not shown) that provides the shape, size, and thickness to the tortillas or flakes of raw dough and which are unfastened from the lower roller with a spear-type device (not shown) that causes them not to stick. Attached to the lower part of the sheeter laminator 100 is the exit conveyor 106 propelled by a roller 107.

Next to the exit conveyor 106 is an acceleration conveyor 108 with an equal transversal section that advances at a greater speed than the exit conveyor 106. The metallic acceleration conveyor 108 is propelled by a system of generation and transmission of movement with an appropriate location comprising a motor 109 with a reducer 110 by which a transmission guard 111 transmits movement and propels the conveyor 108.

The acceleration conveyor 108 has fixed on each side a metallic housing 112. Affixed to the housing 112 are a first and second set of supports 113, 114 in a rectangular shape with a slit on the upper part and with greater separation. Attached to the supports 113, 114 is a third set of supports 115. The third set of supports 115 have equal features to supports 113 and 114. Slits shafts 116, 117 are placed transversally with respect to the acceleration conveyor 108 in a manner that is susceptible of disassembly, while supports 115 support in their slits shafts 118, also transversally. At the same time, shafts 116 and 117 support on both ends, in a manner similar to a swing, the pre-rolling up meshes 119. Such pre-rolling up meshes 119 are placed with a small surface of contact and dragging with the mesh of acceleration conveyor 108, with permits to fold upward only a small portion of the tortilla or flake. On the other hand, shaft 118 supports on one end, in the shape of a curtain, the final rolling up meshes 120, aligned and with equal number as the pre-rolling up meshes 119. The final rolling up meshes 120 show a greater surface of contact and dragging with the acceleration conveyor 108, which permits, with the help of the first folding previously effected, with the pre-rolling up meshes 119, to roll up more easily, perfectly, and efficiently such small tortillas of raw dough of nixtamalized corn.

Such equipment has the particularity of implementing or incorporating as many metallic pre-rolling up meshes 119 and final rolling up meshes 120 for small tortillas of raw dough of nixtamalized corn, on the width of the acceleration conveyor, as lines of product are required.

Such equipment has the particularity of being capable of disassembling the shafts 116, 117, and 118, which support the pre-rolling up meshes 119 and final rolling up meshes 120, for such small tortillas, and continue to produce on such line, products characteristic of the corn line, without the need to make modifications to the structure, nor disassemble the additional equipment, such as the acceleration belt 108, nor the housings 112 with such supports 112, 114, and 115, without affecting the production of other products characteristic of this line.

The invention has been described sufficiently so that a person with intermediate knowledge in the subject may be able to reproduce and obtain the results that we mention in this invention. However, any person capable in the field of the technique that corresponds to this invention may be able to make modifications not described in this application; however, if for the application of such modifications in a determined structure or in the manufacturing process of the same, the subject matter claimed in the following claims is required, such structures will be comprised within the scope of the invention.

Although the preferred embodiment of the invention has been described in the foregoing Detailed Description, it will also be understood that the invention is not limited to the embodiment disclosed, but is capable of numerous rearrangements, modifications and substitutions without departing from the spirit of the invention.

We claim:

1. An apparatus for production of a small tortilla comprising a sheeter laminator;

an exit conveyor operably connected to said sheeter laminator; and an acceleration conveyor transversally positioned to said exit conveyor said acceleration conveyor having pre-rolling up meshes and final rolling up meshes for precise rolling up of small tortillas.

2. The apparatus of claim 1 wherein said acceleration conveyor further comprises a system of generation and transmission of movement to permit varying the speed of the acceleration conveyor.

* * * * *